United States Patent
Wakayama et al.

(10) Patent No.: US 7,096,375 B2
(45) Date of Patent: Aug. 22, 2006

(54) DATA TRANSFER CIRCUIT BETWEEN DIFFERENT CLOCK REGIONS

(75) Inventors: Shigetoshi Wakayama, Kawasaki (JP); Hiroshi Okano, Kawasaki (JP); Yoshio Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 10/299,063

(22) Filed: Nov. 19, 2002

(65) Prior Publication Data

US 2003/0112051 A1 Jun. 19, 2003

(30) Foreign Application Priority Data

Nov. 20, 2001 (JP) .............................. 2001-355289

(51) Int. Cl.
*G06F 1/12* (2006.01)
*G06F 5/06* (2006.01)
*G06F 3/00* (2006.01)

(52) U.S. Cl. ....................... 713/400; 713/400; 713/401; 713/501; 713/600; 710/305; 710/309; 710/310; 710/313

(58) Field of Classification Search ................ 713/400, 713/501, 503, 600, 401; 710/305, 309, 310, 710/311, 313, 316
See application file for complete search history.

(56) References Cited

U.S. PATENT DOCUMENTS

| | | | |
|---|---|---|---|
| 4,926,423 A | 5/1990 | Zukowski | |
| 5,151,995 A | 9/1992 | Garcia | |
| 5,341,370 A * | 8/1994 | Nuhn et al. ................. 370/509 |
| 5,343,435 A | 8/1994 | Bourekas et al. | |
| 5,764,966 A * | 6/1998 | Mote, Jr. ..................... 713/400 |
| 5,841,722 A | 11/1998 | Willenz | |
| 5,892,979 A | 4/1999 | Shiraki et al. | |
| 5,915,128 A * | 6/1999 | Bauman et al. ............... 710/60 |
| 5,968,180 A | 10/1999 | Baco | |
| 6,055,597 A * | 4/2000 | Houg ......................... 710/307 |
| 6,092,129 A * | 7/2000 | Smith et al. .................. 710/60 |
| 6,115,760 A * | 9/2000 | Lo et al. ....................... 710/52 |
| 6,192,395 B1 | 2/2001 | Lerner et al. | |
| 6,256,687 B1 * | 7/2001 | Ellis et al. .................... 710/71 |
| 6,425,088 B1 * | 7/2002 | Yasukawa et al. .......... 713/400 |
| 6,449,655 B1 * | 9/2002 | Hann et al. ................. 709/233 |
| 6,516,420 B1 * | 2/2003 | Audityan et al. ........... 713/400 |
| 6,640,275 B1 * | 10/2003 | Kincaid ...................... 710/305 |
| 6,724,850 B1 * | 4/2004 | Hartwell ..................... 375/376 |
| 6,765,932 B1 * | 7/2004 | Santahuhta ................. 370/503 |
| 6,775,755 B1 * | 8/2004 | Manning .................... 711/167 |
| 6,907,538 B1 * | 6/2005 | Boutaud ..................... 713/400 |
| 6,920,578 B1 * | 7/2005 | Thompson et al. ......... 713/600 |
| 2003/0056137 A1* | 3/2003 | Huelskamp ................. 713/600 |
| 2003/0086503 A1* | 5/2003 | Rennert et al. ............. 375/260 |

FOREIGN PATENT DOCUMENTS

| EP | 0 546 507 A2 | 6/1993 |
|---|---|---|
| JP | 04047731 A * | 2/1992 |

* cited by examiner

*Primary Examiner*—Lynne H. Browne
*Assistant Examiner*—Nitin C. Patel
(74) *Attorney, Agent, or Firm*—Arent Fox PLLC

(57) ABSTRACT

A circuit for data transfer includes a first buffer operating at a first clock frequency, a plurality of second buffers operating at a second clock frequency, and a selector circuit which receives data at the first clock frequency, and supplies the data to a selected one of the first buffer and the second buffers.

6 Claims, 14 Drawing Sheets

FIG.1 (RELATED PRIOR ART)
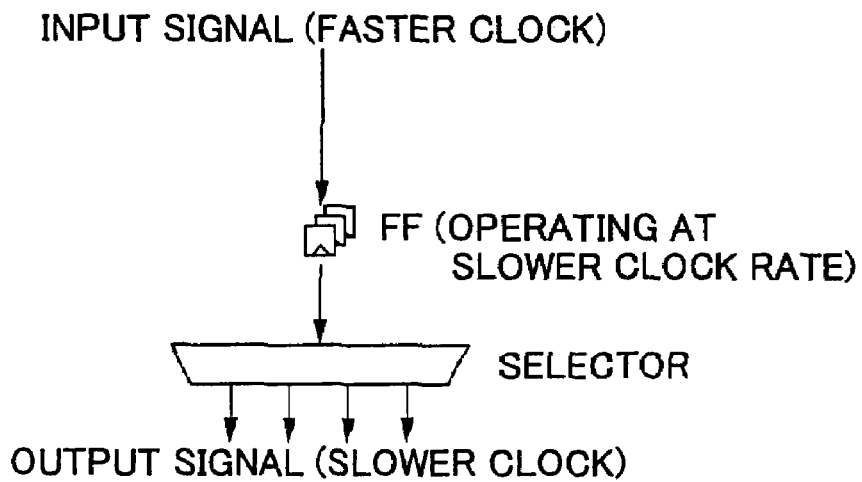
FIG.2 (RELATED PRIOR ART)
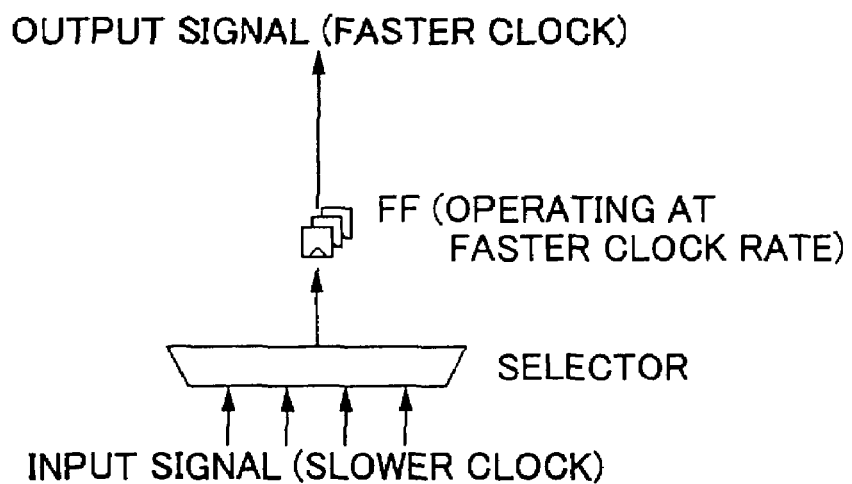

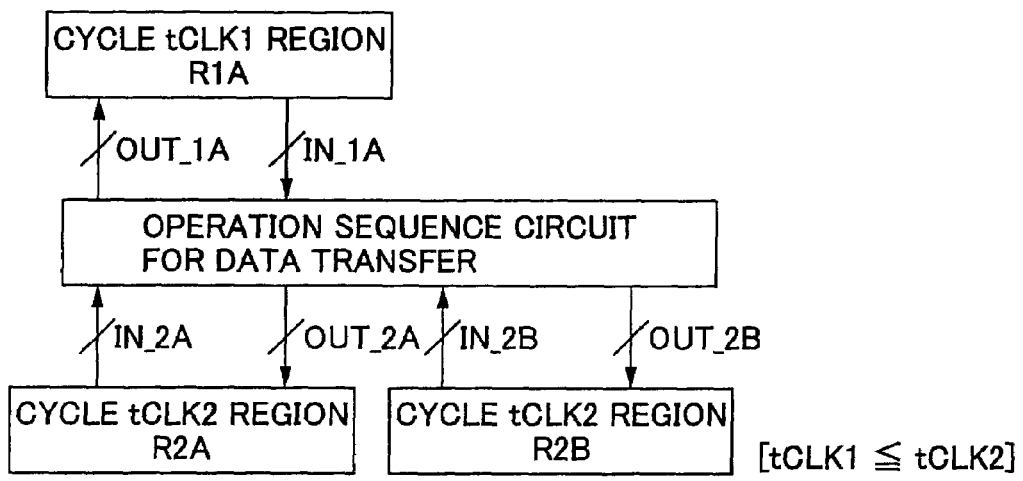
FIG.3 (RELATED PRIOR ART)

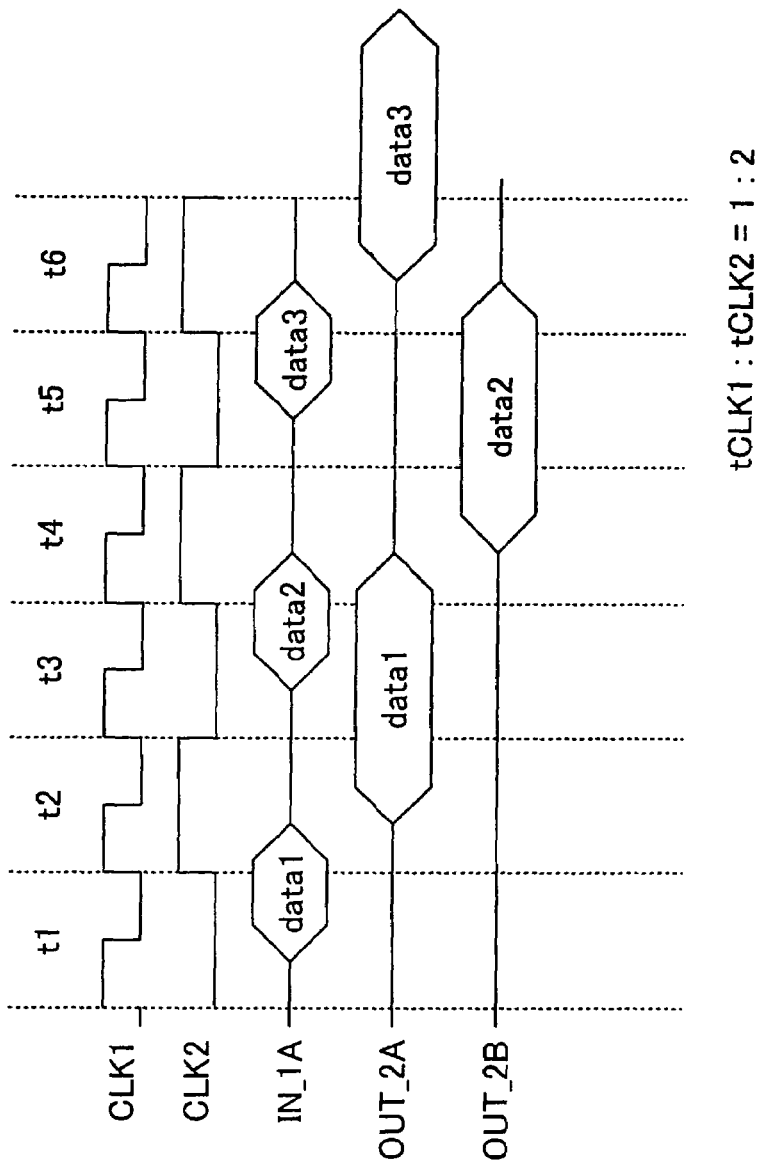
FIG.4 (RELATED PRIOR ART)

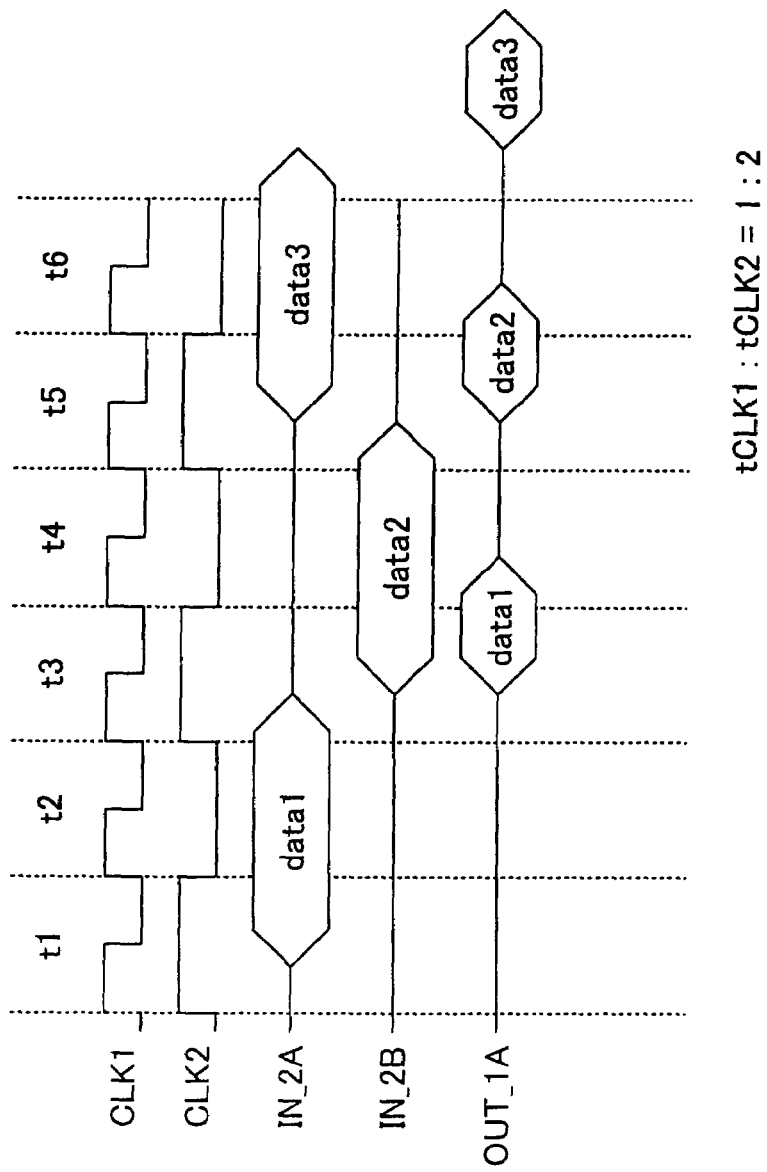
FIG.5 (RELATED PRIOR ART)

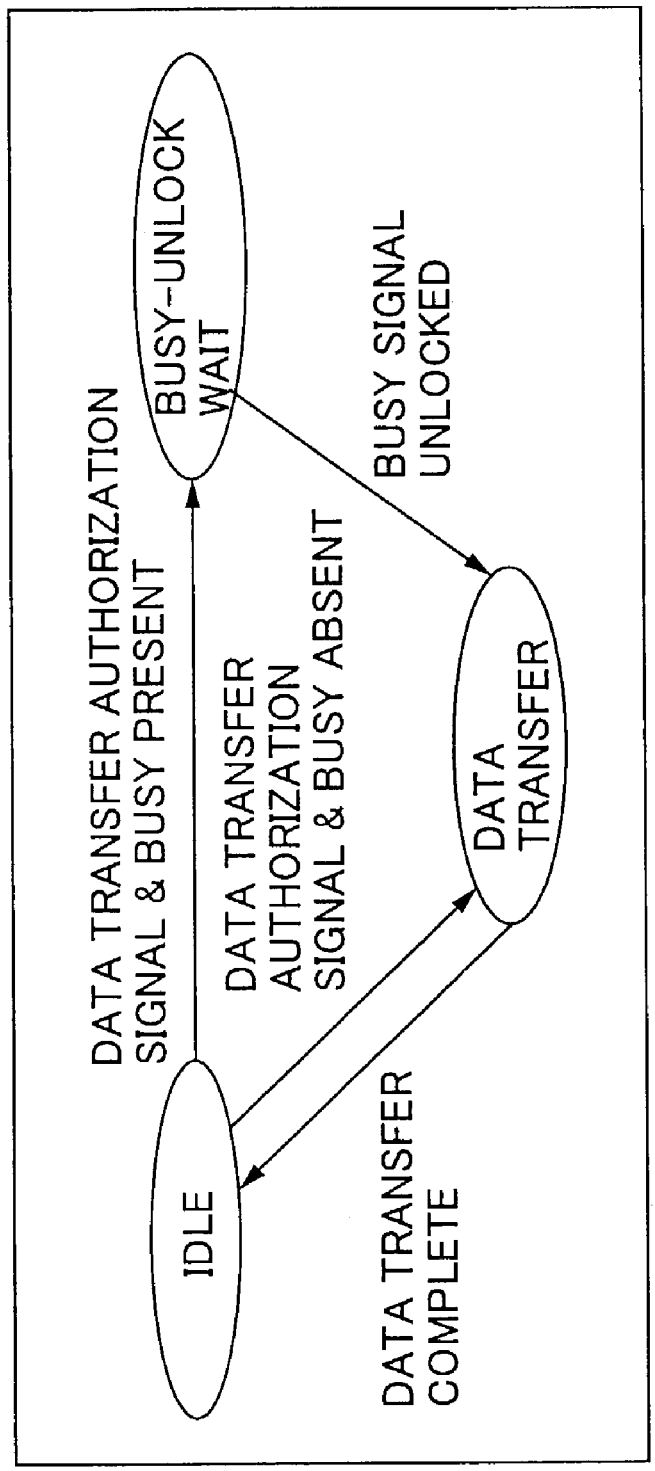

DATA TRANSFER CIRCUIT BETWEEN DIFFERENT CLOCK REGIONS

BACKGROUND OF THE INVENTION

1. Field of the Invention

The present invention generally relates to data transfer circuits, and particularly relates to a data transfer circuit which transfers data between areas having different clock frequencies.

2. Description of the Related Art

As the operation speed of LSI circuits increases, a gap in operation frequencies is widened between the interior of the LSI circuits and the exterior of the LSI circuits. This leads to a need for an operation sequence circuit that transfers data between areas having different operation frequencies. Also, where complex procedures having been implemented by software are now to be implemented through hardware, a plurality of LSI circuits having, different functions need to be connected together. This also leads to a need for an operation sequence circuit that transfers data between areas of different operation frequencies.

Attention is now directed to data transfer between an area having a faster clock rate and a plurality of areas having a slower clock rate. FIG. 1 and FIG. 2 are illustrative drawings showing operation sequence circuits that are situated between the area having a faster clock rate and the plurality of areas having a slower clock rate.

When data is transferred from the area of a faster clock rate to the areas of a slower clock rate (FIG. 1), flip-flops operating at the slower clock rate receive data, and, then, the data are transmitted to the areas of the slower clock rate by selecting a destination of transfer by use of a selector. When data is transferred from the areas of the slower clock rate to the area of the faster clock rate (FIG. 2), data sources operating at the slower clock rate are selected by a selector, and flip-flops operating at the faster clock rate receive data, followed by transmitting the data to the area of the faster clock rate.

FIG. 3 is a drawing showing interface signals used by an operation sequence circuit that transfers data between areas of different frequencies. In FIG. 3, data transfer is conducted between an area R1A operating at a clock cycle tCLK1 and two areas R2A and R2B operating at a clock cycle tCLK2. A signal input from the area R1A and a signal output to the area R1A are IN_1A and OUT_1A respectively. A signal input from the area R2A and a signal output to the area R2A are IN_2A and OUT_2A respectively. Further, a signal input from the area R2B and a signal output to the area R2B are IN_2B and OUT_2B, respectively.

tCLK1 is equal to or shorter than tCLK2. In the following, tCLK1:tCLK2 is assumed to be 1:2, for the sake of explanation.

FIG. 4 is a timing chart showing data transfer timings in the case of FIG. 1. This relates to a case in which data is transferred from an area of a faster clock area to an area of a slower clock area.

When data is transferred one by one from the area R1A operating at the clock cycle tCLK1 to the areas R2A and R2B operating at the clock cycle tCLK2, the area R1A supplies data1 at t1 and data2 at t3. The area R2A receives data1 at t4, and the area R2B receives data2 at t6. Since the data needs to be supplied at the rate corresponding to the slower frequency, data1 and data2 of IN_1A need to be spaced apart by one clock cycle.

FIG. 5 is a timing chart showing data transfer timings in the case of FIG. 2. This relates to a case in which data is transferred from an area of a slower clock area to an area of a faster clock area.

When data is transferred one by one from the areas R2A and R2B operating at the clock cycle tCLK2 to the area R1A operating at the clock cycle tCLK1, the area R2A supplies data1 at t1, and the area R2B supplies data2 at t3. The area R1A receives data1 at t4, and receives data2 at t6. Since the data are received at the rate corresponding to the slower frequency, data1 and data2 of OUT_1A need to be spaced apart by one clock cycle.

Accordingly, there is a need for a scheme in which delays in data transfer is reduced when transferring data between areas of different operation frequencies.

SUMMARY OF THE INVENTION

It is a general object of the present invention to provide a data transfer circuit that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a data transfer circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a circuit for data transfer, including a first buffer operating at a first clock frequency, a plurality of second buffers operating at a second clock frequency, and a selector circuit which receives data at the first clock frequency, and supplies the data to a selected one of the first buffer and the second buffers.

In the data transfer circuit described above, the first clock frequency is higher than the second clock frequency, and data of the first buffer is transferred to one of the second buffers in synchronization with a clock signal having the second clock frequency, followed by simultaneously outputting data of the second buffers at the second clock frequency.

According to the data transfer circuit described above, the selector circuit selects a destination to which the input signal is delivered, and sends data to the selected one of first buffer and the second buffers. The first buffer operates at the faster frequency, and the second buffers operate at the slower frequency. Data stored in the second buffers are directly output to the slower clock region. The data of the first buffer is temporarily stored in one of the second buffers, followed by being output to the slower clock region. In this manner, when data is to be transferred from the faster clock region to the slower clock region, the first buffer is utilized to receive a plurality of data pieces of the input signal at the faster clock rate, followed by storing the plurality of data pieces in the respective second buffers. Thereafter, the plurality of data pieces stored in the second buffers are simultaneously transmitted to respective destinations at the slower clock rate.

Moreover, a circuit for data transfer includes a plurality of buffers which receive data at a first clock frequency from respective data sources, and a selector circuit which selects one of the buffers one after another at the second clock frequency, thereby successively outputting data of the selected one of the buffers to a data destination at the second clock frequency.

According to the data transfer circuit described above, when data is to be transferred from the slower clock region to the faster clock region, the buffers receive input data pieces at the slower clock rate. Thereafter, the data pieces stored in the respective buffers are successively selected and transmitted to the destination at the faster clock rate.

In the related-art configuration, only data transfer conforming to the clock cycle of the slower clock rate can be performed. The present invention, on the other hand, achieves data transfer at the clock frequency corresponding to the faster clock region.

Other objects and further features of the present invention will be apparent from the following detailed description when read in conjunction with the accompanying drawings.

BRIEF DESCRIPTION OF THE DRAWINGS

FIG. 1 is an illustrative drawing showing an operation sequence circuit that is situated between the area having a faster clock rate and the plurality of areas having a slower clock rate;

FIG. 2 is an illustrative drawing showing an operation sequence circuit that is situated between the area having a faster clock rate and the plurality of areas having a slower clock rate;

FIG. 3 is a drawing showing interface signals used by an operation sequence circuit that transfers data between areas of different frequencies;

FIG. 4 is a timing chart showing data transfer timings in the case of FIG. 1;

FIG. 5 is a timing chart showing data transfer timings in the case of FIG. 2;

FIG. 17 is a chart showing the state transitions of a state machine.

DESCRIPTION OF THE PREFERRED EMBODIMENTS

In the following, embodiments of the present invention will be described with reference to the accompanying drawings.

Figure 6:
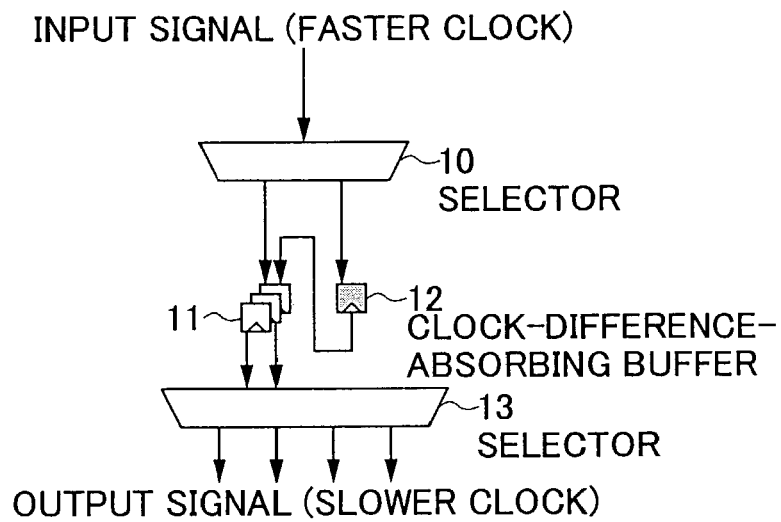
FIG. 6 is a block diagram for explaining the principle of the present invention when data is transferred from an area of faster frequency to areas of slower frequency.

FIG. 6 is a block diagram for explaining the principle of the present invention when data is transferred from an area of faster frequency to areas of slower frequency.

As shown in FIG. 6, an operation sequence circuit that transfers data between areas of different operation frequencies includes a selector 10, a plurality of buffers 11, at least one clock-difference-absorbing buffer 12, and a selector 13. When transferring data from the faster clock region to the slower clock region, the selector 10 selects a destination to which the input signal is delivered, and sends the data to the ordinary buffers 11 or the clock-difference-absorbing buffer 12. The ordinary buffers 11 operate at the slower clock rate, and the clock-difference-absorbing buffer 12 operates at the faster clock rate. The data stored in the buffers 11 are output to the slower clock region without any intervening buffers. The data stored in the clock-difference-absorbing buffer 12 is output to the slower clock region after temporal buffering in the ordinary buffers 11.

In this manner, when data is to be transferred from the faster clock region to the slower clock region, the clock-difference-absorbing buffer 12 is utilized to receive a plurality of data pieces of the input signal at the faster clock rate, followed by storing the plurality of data pieces in the respective buffers 11. Thereafter, the plurality of data pieces stored in the respective buffers 11 are simultaneously transmitted to final destinations via the selector 13 at the slower clock rate.

Figure 7:
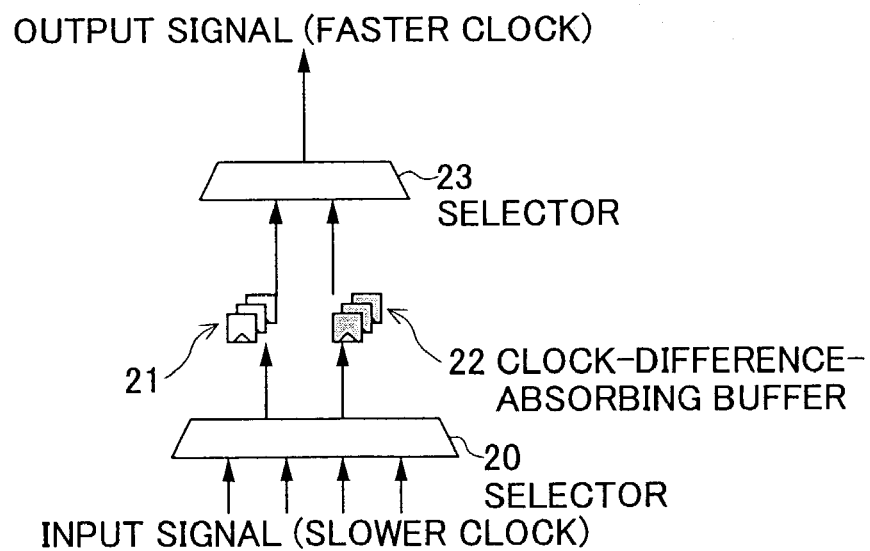
FIG. 7 is a drawing for explaining the principle of the present invention when data is transferred from areas of slower frequency to an area of faster frequency.

FIG. 7 is a drawing for explaining the principle of the present invention when data is transferred from areas of slower frequency to an area of faster frequency.

As shown in FIG. 7, an operation sequence circuit that transfers data between areas of different operation frequencies includes a selector 20, at least one buffer 21, at least one clock-difference-absorbing buffer 22, and a selector 23. When transferring data from the slower clock region to the faster clock region, the selector 20 selects a destination to which the input signal is delivered, and sends the data to the ordinary buffer 21 or to the clock-difference-absorbing buffer 22. The ordinary buffer 21 and the clock-difference-absorbing buffer 22 operate at the slower clock rate. The data stored in the ordinary buffer 21 and the clock-difference-absorbing buffer 22 are successively selected by the selector 23 to be output to the faster clock region.

In this manner, when data is to be transferred from the slower clock region to the faster clock region, the clock-difference-absorbing buffer 22 is utilized such that the ordinary buffer 21 together with the clock-difference-absorbing buffer 22 receive input data pieces at the slower clock rate. Thereafter, the plurality of data pieces stored in the respective buffers are successively selected and transmitted to the final destination at the faster clock rate.

The present invention is quite different from the related-art configuration. In the related-art configuration, only data transfer conforming to the clock cycle of the slower clock rate can be performed. In the present invention, however, the clock-difference-absorbing buffer is utilized to allow data transfer to be performed at the cycle corresponding to the faster clock region.

Figure 8:
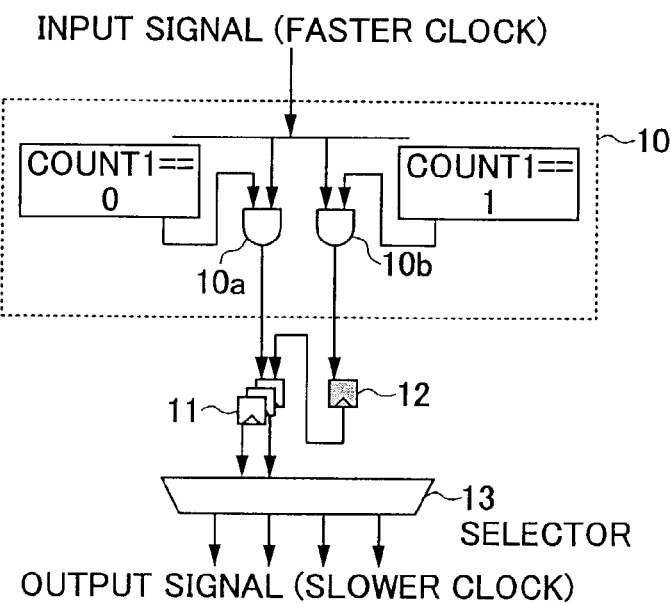
FIG. 8 is a block diagram showing a first embodiment of the present invention with respect to a case in which data is transferred from the faster clock region to the slower clock region.
Figure 9:
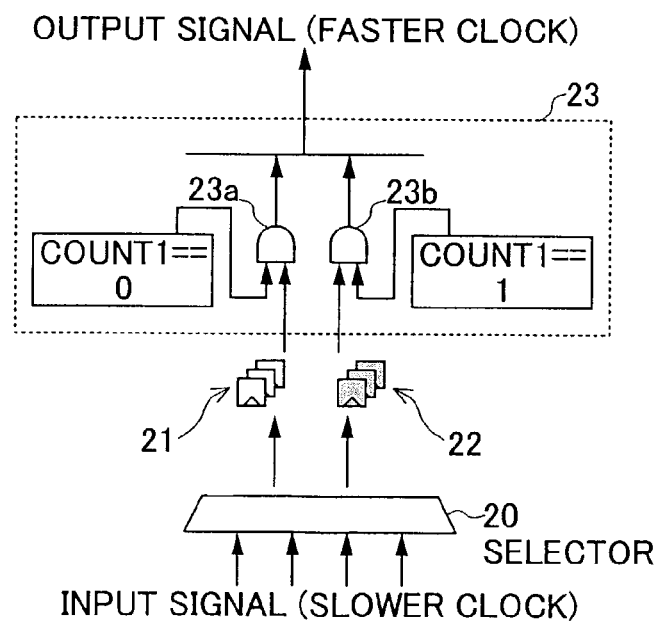
FIG. 9 is a block diagram showing a first embodiment of the present invention with respect to a case in which data is transferred from the slower clock region to the faster clock region.

FIG. 8 is a block diagram showing a first embodiment of the present invention with respect to a case in which data is transferred from the faster clock region to the slower clock region. FIG. 9 is a block diagram showing a first embodiment of the present invention with respect to a case in which data is transferred from the slower clock region to the faster clock region.

In FIG. 8, the selector 10 includes AND gates 10a and 10b, and delivers the input signal to either one of the buffers 11 or the clock-difference-absorbing buffer 12 in accordance with a signal COUNT1. In FIG. 9, the selector 23 includes AND gates 23a and 23b, and selects an output signal from the ordinary buffer 21 or an output signal from the clock-difference-absorbing buffer 22 in accordance with a signal COUNT1.

Figure 10:
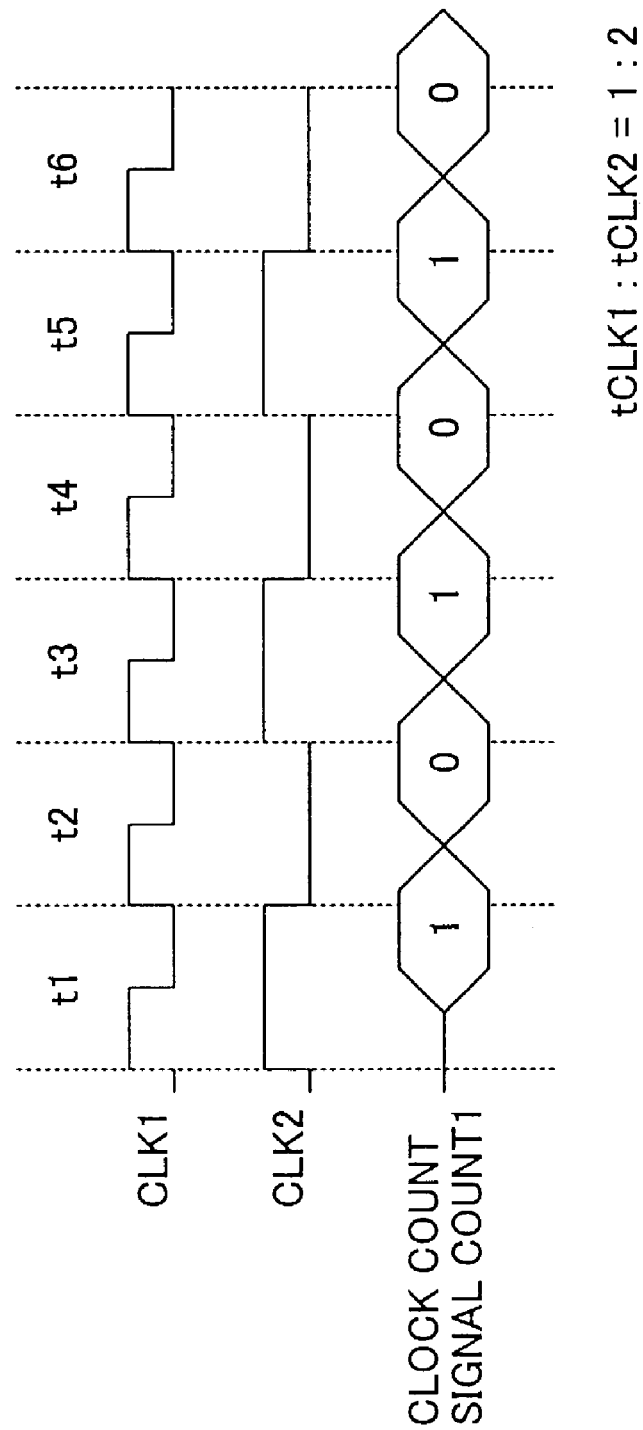
FIG. 10 is a timing chart showing the relationship between the signal COUNT1 and each clock signal.

FIG. 10 is a timing chart showing the relationship between the signal COUNT1 and each clock signal.

In order to select an input/output signal of the buffers, the clock count signal COUNT1 is utilized. The clock count signal COUNT1 decreases one count per cycle with respect to the faster clock (i e., CLK1 in the case of FIG. 10). The clock count signal COUNT1 becomes zero when both the faster clock and the slower clock (i.e., CLK2 in FIG. 10) have the rising edges at the same timing.

The detail of operation will be described below with reference to a case in which tCLK1:tCLK2 is 1:2. In the selector 10 that transfers data from the faster clock region to the slower clock region, the AND gate 10a opens when the clock count signal COUNT1 is "0", and the AND gate 10b opens when the clock count signal COUNT1 is "1". In the case of the clock count signal COUNT1 being "0", the ordinary buffers 11 receive the input signal, and output the signal to the slower clock region at the following clock cycle. In the case of the clock count signal COUNT1 being "1", the clock-difference-absorbing buffer 12 receives the input signal, which is transferred to the ordinary buffers 11 at the next cycle, followed by being output to the slower clock region at the further following cycle.

In the selector 23 that transfers data from the slower clock region to the faster clock region, the AND gate 23a opens when the clock count signal COUNT1 is "0", and the AND gate 23b opens when the clock count signal COUNT1 is "1". In the case of the clock count signal COUNT1 being "0", data of the ordinary buffer 21 is output to the faster clock region. In the case of the clock count signal COUNT1 being "1", data of the clock-difference-absorbing buffer 22 is output to the faster clock region.

Figure 11:
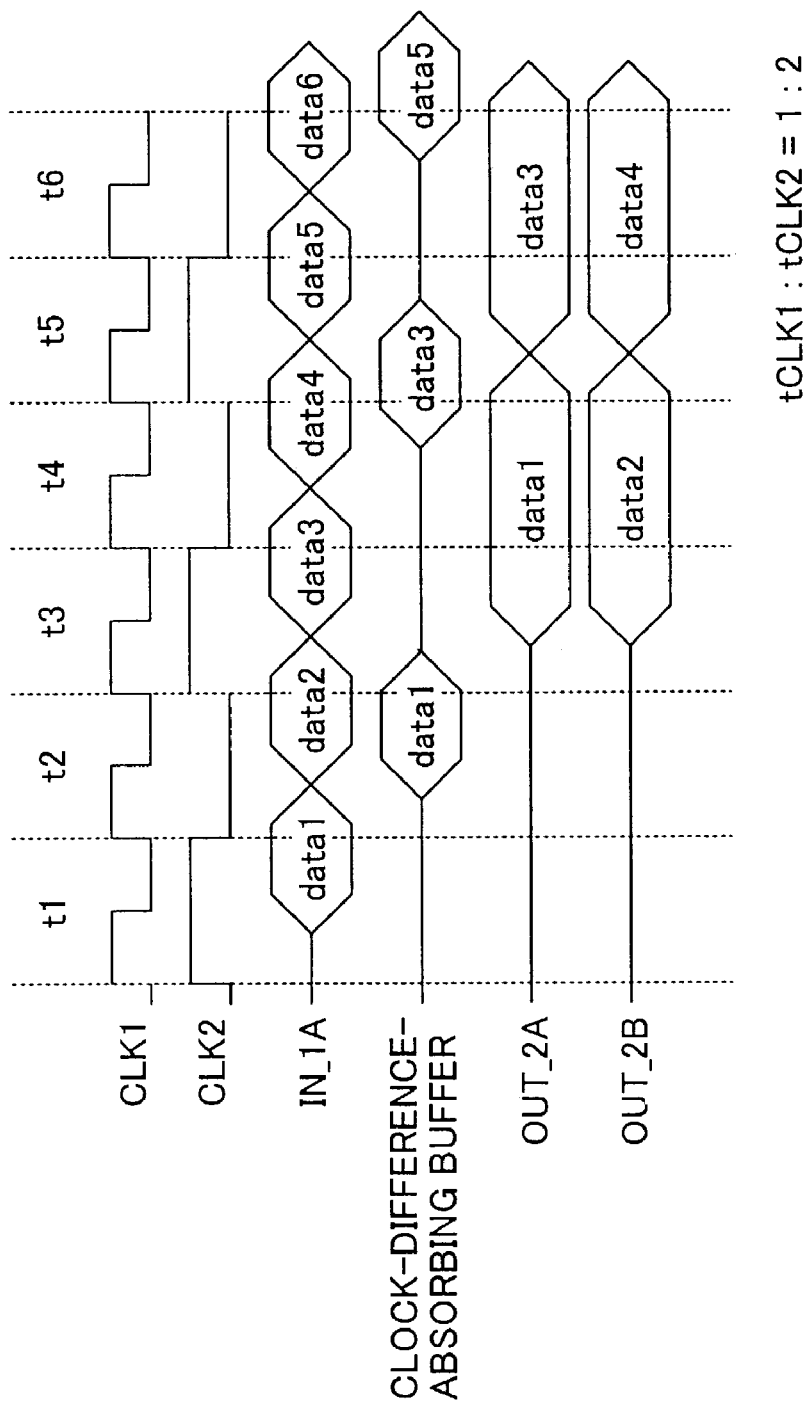
FIG. 11 is a timing chart showing an operation that is performed when data is transferred from the faster clock region to the slower clock region.

FIG. 11 is a timing chart showing an operation that is performed when data is transferred from the faster clock region to the slower clock region.

When data is transferred one by one from the area R1A operating at the clock cycle tCLK1 to the areas R2A and R2B operating at the clock cycle tCLK2, the area R1A supplies data1 at t1 and data2 at t2. The area R2A receives data1 at t5, and the area R2B receives data2 at t5. Since the data does not have to be supplied at the rate corresponding to the slower frequency, data1 and data2 of IN_1A are transferred consecutively without an intervening space.

Figure 12:
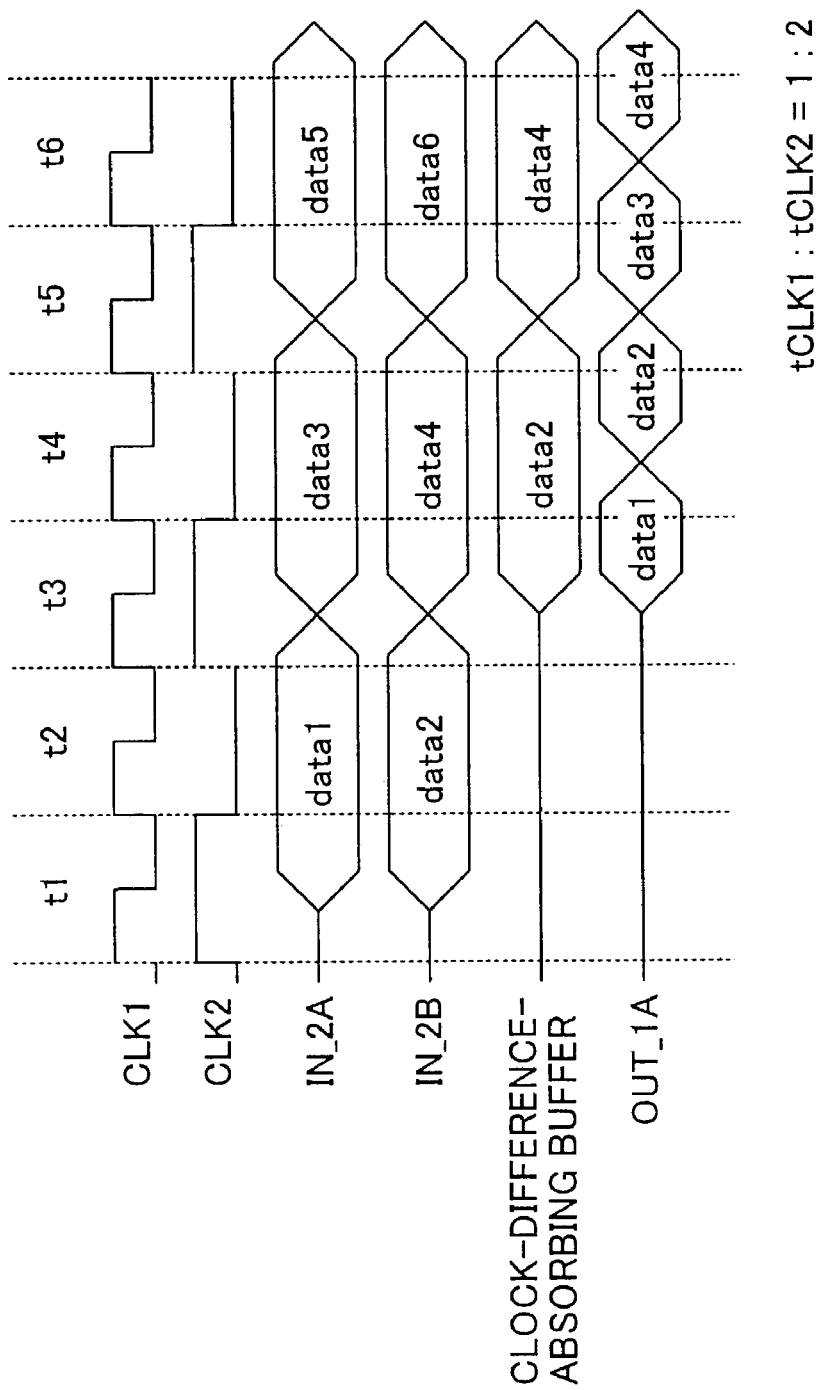
FIG. 12 is a timing chart showing an operation that is performed when data is transferred from the slower clock region to the faster clock region.

FIG. 12 is a timing chart showing an operation that is performed when data is transferred from the slower clock region to the faster clock region. When data is transferred one by one from the areas R2A and R2B operating at the clock cycle tCLK2 to the area R1A operating at the clock cycle tCLK1, the area R2A supplies data1 at t1, and the area R2B supplies data2 at t1. The area R1A receives data1 at t4, and further receives data2 at t5. Since the data need not be transferred at the rate corresponding to the slower frequency, data1 and data2 of OUT_1A are transferred consecutively without an intervening space.

Figure 13:
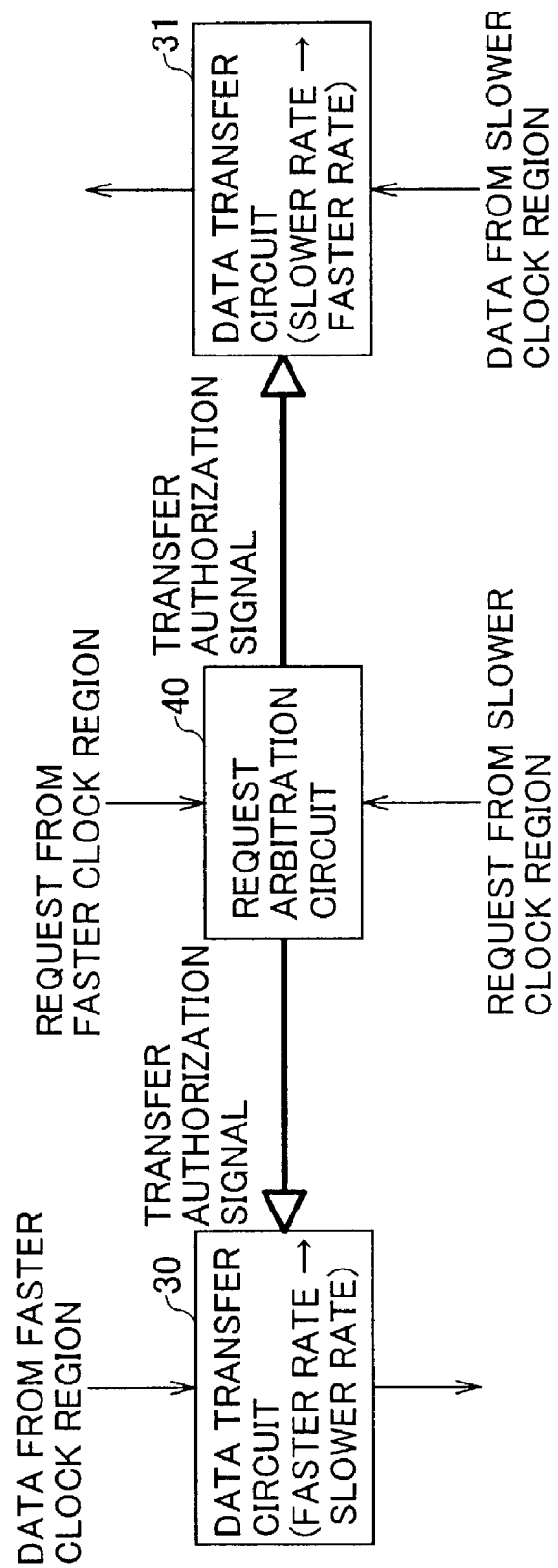
FIG. 13 is a block diagram showing an entire configuration according to a second embodiment of the present invention.

FIG. 13 is a block diagram showing an entire configuration according to a second embodiment of the present invention.

The configuration of FIG. 13 includes data transfer circuits 30 and 31 and a request arbitration circuit 40. The data transfer circuits 30 and 31 have the configurations of FIG. 6 and FIG. 7, respectively, and attend to data transfer from the faster clock region to the slower clock region and data transfer form the slower clock region to the faster clock region, respectively.

As shown in FIG. 13, the request arbitration circuit 40 receives a request for data transfer from the faster clock region to the slower clock region, and also receives a request for data transfer from the slower clock region to the faster clock region. In response to either one of these requests, the request arbitration circuit 40 generates a signal as data transfer authorization, which is given to the data transfer circuit 30 or the data transfer circuit 31 in accordance with the request.

Figure 14:
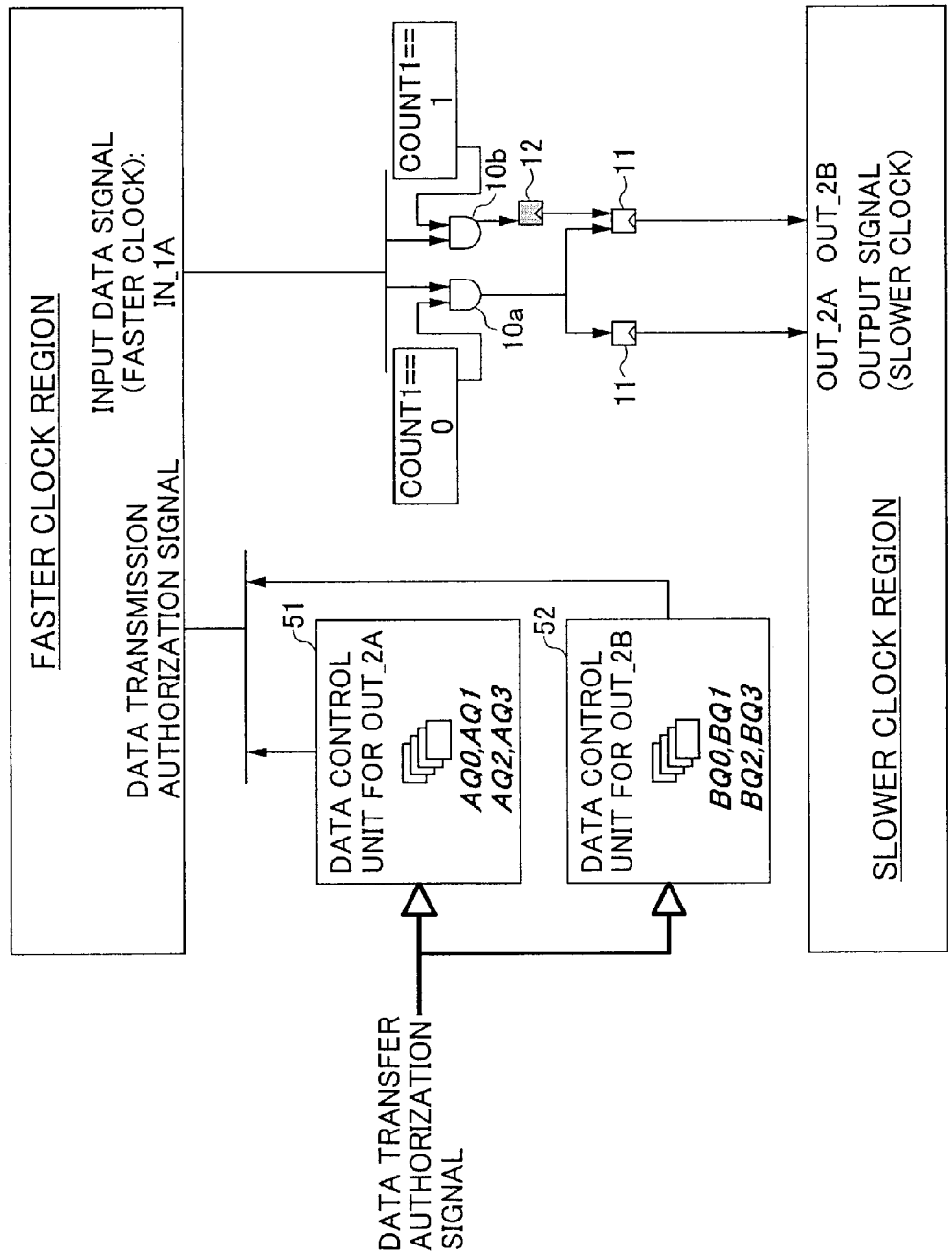
FIG. 14 is an illustrative drawing for explaining a case in which the data transfer authorization signal is issued to a data transfer circuit.

FIG. 14 is an illustrative drawing for explaining a case in which the data transfer authorization signal is issued to the data transfer circuit 30.

In FIG. 14, the data transfer circuit 30 includes data control units 51 and 52 in addition to the data transfer circuit portion as shown in FIG. 8. The data control units 51 and 52 are provided separately for respective outputs, and include a plurality of state machines AQ0, AQ1, AQ2, and AQ3 and a plurality of state machines BQ0, BQ1, BQ2, and BQ3, respectively. With this provision, a request following a given request can be received even before the processing of this given request is completed.

Figure 15:
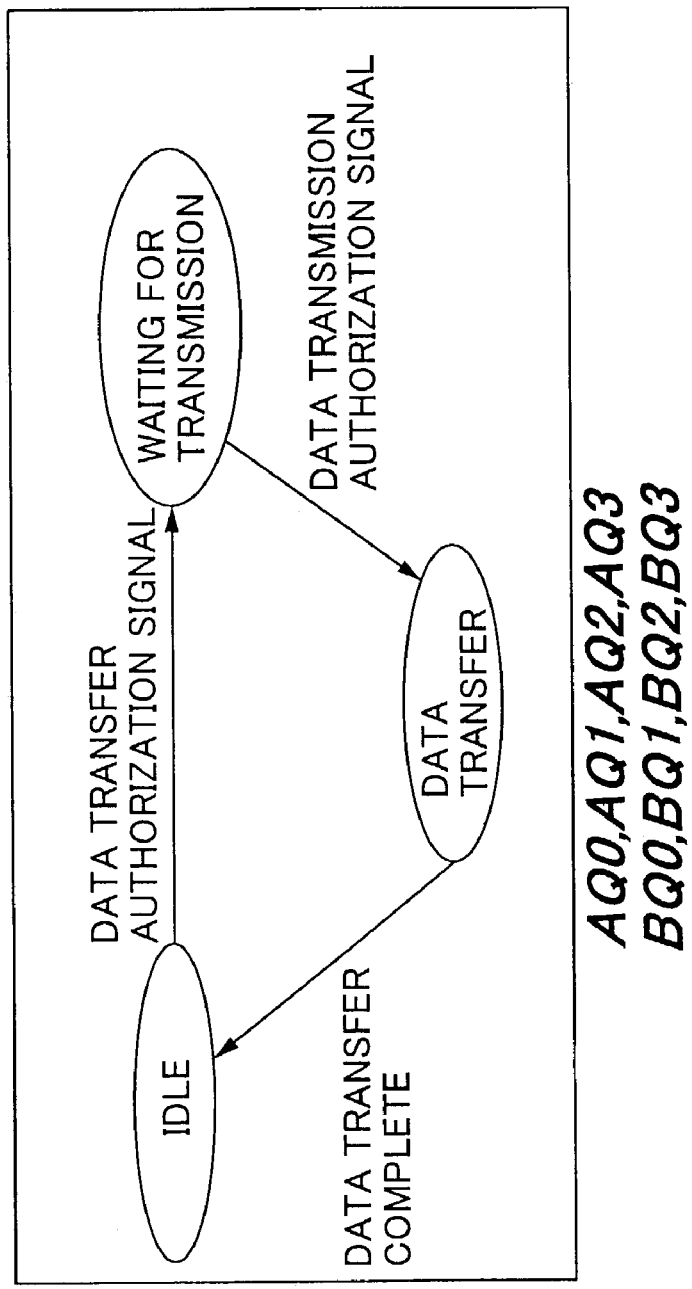
FIG. 15 is a chart showing the state transitions of a state machine.

FIG. 15 is a chart showing the state transitions of a state machine. In response to a data transfer authorization signal, state transition takes place, shifting from an idle state to a transmission wait state. Arbitration is conducted between the data control units 51 and 52, thereby sending a data transmission authorization signal to the faster clock region. When this happens, the state machine shifts into a data transfer state. Data is then supplied from the faster clock region. As was described in connection with FIG. 8, either the ordinary buffers 11 or the clock-difference-absorbing buffer 12 receives data in accordance with the clock count signal COUNT1, and, then, the data is output to the slower clock region at proper timing.

Figure 16:
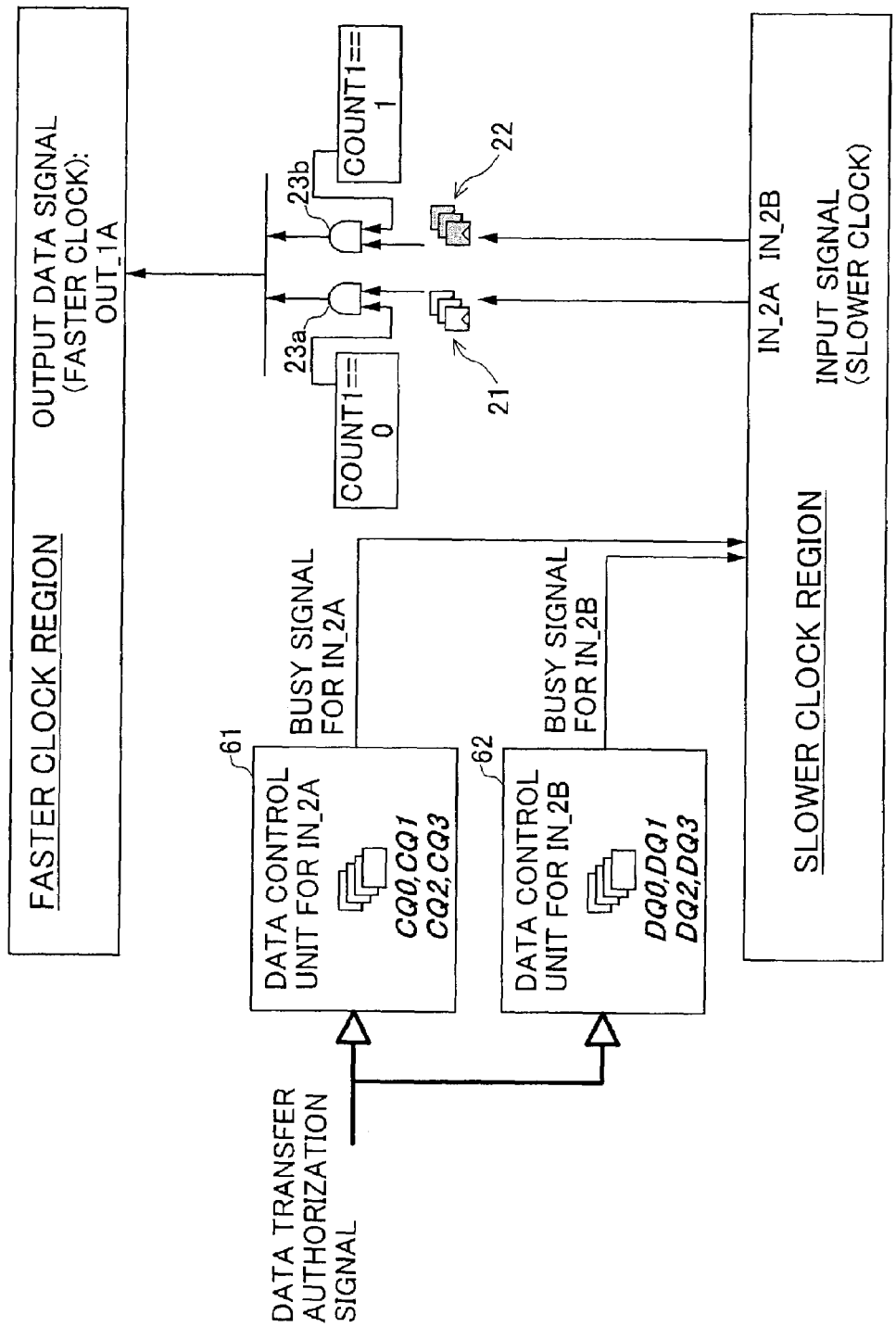
FIG. 16 is an illustrative drawing for explaining a case in which the data transfer authorization signal is issued to another data transfer circuit.

FIG. 16 is an illustrative drawing for explaining a case in which the data transfer authorization signal is issued to the data transfer circuit 31.

In FIG. 16, the data transfer circuit 31 includes data control units 61 and 62 in addition to the data transfer circuit portion as shown in FIG. 9. The data control units 61 and 62 are provided separately for respective inputs, and include a plurality of state machines. With this provision, a request following a given request can be received even before the processing of this given request is completed.

FIG. 17 is a chart showing the state transitions of a state machine. The data transfer circuit decides whether to authorize data transmission by use of a BUSY signal. Namely, if a BUSY signal is asserted when the slower clock region issues data, it is ascertained that there is a preceding data issue that is now being processed. If the BUSY signal is in a negated state when the slower clock region issues data, it is ascertained that there is no preceding data issue. The state machine in the idle state shifts into a BUSY-unlock wait state if the data transfer authorization signal is received and if there is a BUSY signal, and shifts into a data transfer state if the data transfer authorization signal is received and if there is no BUSY signal. When the BUSY signal comes to an end for negation during the BUSY-unlock wait state, the state machine shifts into the data transfer state. When data transfer comes to an end in the data transfer state, transition to the idle state is made. In the data transfer process, data of the ordinary buffer 21 or data of the clock-difference-absorbing buffer 22 is selected for output to the faster clock region in accordance with the clock count signal COUNT1, as was described in connection with FIG. 9.

Further, the present invention is not limited to these embodiments, but various variations and modifications may be made without departing from the scope of the present invention.

The present application is based on Japanese priority application No. 2001-355289 filed on Nov. 20, 2001, with the Japanese Patent Office, the entire contents of which are hereby incorporated by reference.

What is claimed is:

1. A circuit for data transfer, comprising:
   a selector circuit configured to receive data at a first clock frequency;
   a first buffer coupled to said selector circuit to store data supplied from said selector circuit by operating at the first clock frequency; and
   a plurality of second buffers coupled to said selector circuit to store data supplied from said selector circuit by operating at a second clock frequency,
   wherein said selector circuit is configured to select one of said first buffer and said second buffers successively to send the received data to the selected one of said first buffer and said second buffers.

2. The circuit as claimed in claim 1, wherein the first clock frequency is higher than the second clock frequency.

3. The circuit as claimed in claim 2, wherein data of said first buffer is transferred to one of said second buffers in synchronization with a clock signal having the second clock frequency.

4. The circuit as claimed in claim 3, wherein said second buffers simultaneously output data thereof at the second clock frequency.

5. The circuit as claimed in claim 1, wherein said selector circuit selects one of said first buffer and said second buffers depending on a relative phase of a clock signal having the first clock frequency to a clock signal having the second clock frequency.

6. The circuit as claimed in claim 5, wherein the relative phase is identified by counting a number of clock pulses of the clock signal having the first clock frequency.

* * * * *